(12) United States Patent
Fischer et al.

(10) Patent No.: US 9,507,808 B2
(45) Date of Patent: Nov. 29, 2016

(54) TECHNIQUE FOR STRUCTURING NAVIGATION DATA

(71) Applicant: Elektrobit Automotive GmbH, Erlangen (DE)

(72) Inventors: Sebastian Fischer, Erlangen (DE); Holger Dormann, Nuremberg (DE)

(73) Assignee: Elektrobit Automotive GmbH, Erlangen (DE)

( * ) Notice: Subject to any disclaimer, the term of this patent is extended or adjusted under 35 U.S.C. 154(b) by 748 days.

(21) Appl. No.: 13/669,591

(22) Filed: Nov. 6, 2012

(65) Prior Publication Data

US 2013/0117322 A1    May 9, 2013

(30) Foreign Application Priority Data

Nov. 7, 2011    (EP) .................................... 11008834

(51) Int. Cl.
| | | |
|---|---|---|
| *G06F 17/00* | (2006.01) | |
| *G06F 17/30* | (2006.01) | |
| *G06N 5/00* | (2006.01) | |
| *G01C 21/32* | (2006.01) | |

(52) U.S. Cl.
CPC ......... *G06F 17/30289* (2013.01); *G01C 21/32* (2013.01); *G06N 5/003* (2013.01)

(58) Field of Classification Search
None
See application file for complete search history.

(56) References Cited

U.S. PATENT DOCUMENTS

| | | | | |
|---|---|---|---|---|
| 6,922,157 B2 * | 7/2005 | Kimura | ................ | G06T 17/05 340/990 |
| 7,145,500 B2 * | 12/2006 | Ikeda | ................ | G01S 13/931 342/118 |
| 7,215,644 B2 * | 5/2007 | Wu | ................ | H04L 45/50 370/238 |
| 7,526,492 B2 * | 4/2009 | Mikuriya | ................ | G01C 21/32 701/450 |
| 8,537,162 B2 * | 9/2013 | Nomura | ................ | G01C 21/32 340/988 |
| 2004/0125989 A1 | 7/2004 | Kimura | | |
| 2005/0058155 A1 | 3/2005 | Mikuriya et al. | | |
| 2009/0248758 A1 * | 10/2009 | Sawai | ................ | G01C 21/32 |
| 2010/0225651 A1 | 9/2010 | Nomura | | |

(Continued)

FOREIGN PATENT DOCUMENTS

| | | | | |
|---|---|---|---|---|
| EP | 2 077 542 A1 | 7/2009 | | |
| EP | 2077542 A1 * | 7/2009 | ............. | G01C 21/32 |

(Continued)

OTHER PUBLICATIONS

European Search Report completed on Jul. 2, 2012 in corresponding application No. EP 11 00 8834.

(Continued)

*Primary Examiner* — Kakali Chaki
*Assistant Examiner* — Fuming Wu
(74) *Attorney, Agent, or Firm* — Carter, DeLuca, Farrell & Schmidt, LLP

(57) ABSTRACT

A technique for structuring a navigation data base in order to support incremental data updates is provided. A method implementation of the technique includes the steps of providing at least two data levels, wherein a first data level is associated with route links representing road segments of regional distance roads, partitioning the first data level into local tiles, wherein each local tile is associated with route links representing road segments of regional distance roads for a specific local geographic area, and interlinking those route links of neighboring local tiles that represent road segment portions of a regional distance road extending over neighboring local tiles.

28 Claims, 12 Drawing Sheets

(56) References Cited

U.S. PATENT DOCUMENTS

| | | | | |
|---|---|---|---|---|
| 2010/0235083 A1* | 9/2010 | Takahata | ................ | G01C 21/32 701/533 |
| 2010/0262359 A1* | 10/2010 | Motoyama | ......... | G01C 21/3446 701/532 |
| 2010/0329508 A1* | 12/2010 | Chen | .................. | G06K 9/00697 382/103 |
| 2013/0006925 A1* | 1/2013 | Sawai | ............... | G06F 17/30241 707/609 |
| 2013/0117321 A1* | 5/2013 | Fischer | .................. | G01C 21/32 707/792 |
| 2013/0117322 A1* | 5/2013 | Fischer | ............ | G06F 17/30289 707/792 |

FOREIGN PATENT DOCUMENTS

| | | | |
|---|---|---|---|
| JP | 2006-064644 A | | 3/2006 |
| JP | 2007-101865 A | | 4/2007 |
| JP | WO 2008044584 A1 * | 4/2008 | ............. G01C 21/32 |
| JP | WO 2008047448 A1 * | 4/2008 | ............. G01C 21/32 |
| JP | WO 2008126683 A1 * | 10/2008 | ............. G01C 21/32 |
| JP | EP 2077542 A1 * | 7/2009 | ............. G01C 21/32 |
| JP | 2010-217140 A | 9/2010 | |
| JP | WO 2011118422 A1 * | 9/2011 | ............. G01C 21/32 |
| JP | 2011-214890 A | 10/2011 | |
| WO | 2008/044584 A1 | 4/2008 | |
| WO | 2008/047448 A1 | 4/2008 | |
| WO | WO 2008044584 A1 * | 4/2008 | ............. G01C 21/32 |
| WO | WO 2008047448 A1 * | 4/2008 | ............. G01C 21/32 |
| WO | 2008/126683 A1 | 10/2008 | |
| WO | WO 2008126683 A1 * | 10/2008 | ............. G01C 21/32 |
| WO | 2011/118422 A1 | 9/2011 | |

OTHER PUBLICATIONS

Office Action for corresponding Japanese Application No. 2012-244404 mailed Feb. 4, 2014.

* cited by examiner

Fig. 6
| Road Functional Class | Data level | Routing data | Destination Entry data | POI data |
|---|---|---|---|---|
| 0 | Far Distance Level, FDL  120 | Far Distance road data | Global destination Entry (GDE) data | Global POI data (airports, ports, ...) |
| 1 | | | | |
| 2 | Regional Distance Level, RDL  100 | Regional Distance road data | Local Destination Entry (LDE) data | Local POI data (restaurants, pharmacies, ...) |
| 3 | | | | |
| 4 | | | | |
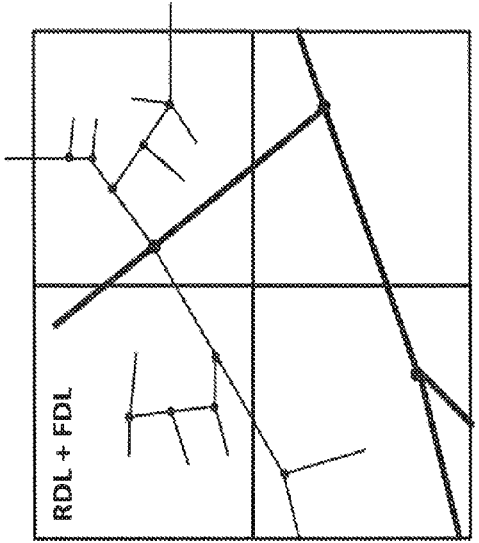
Fig. 7c  RDL + FDL
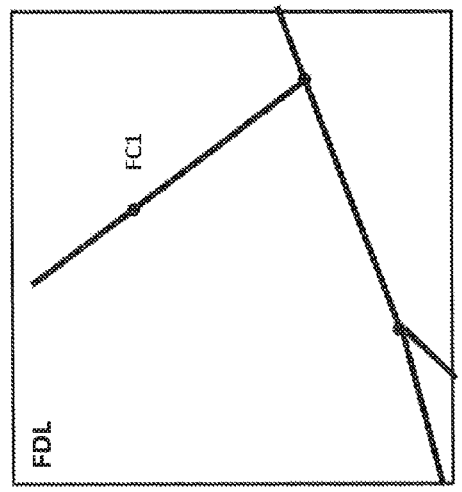
Fig. 7b  FDL
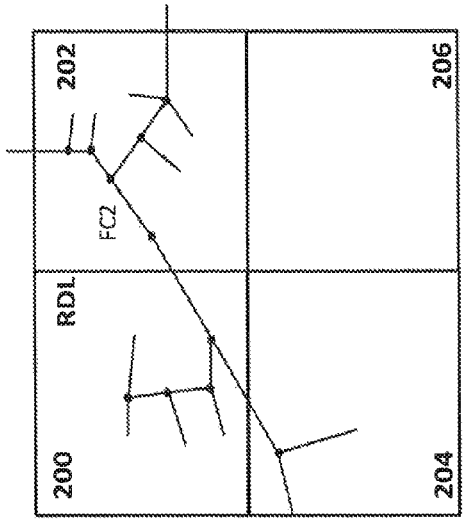
Fig. 7a

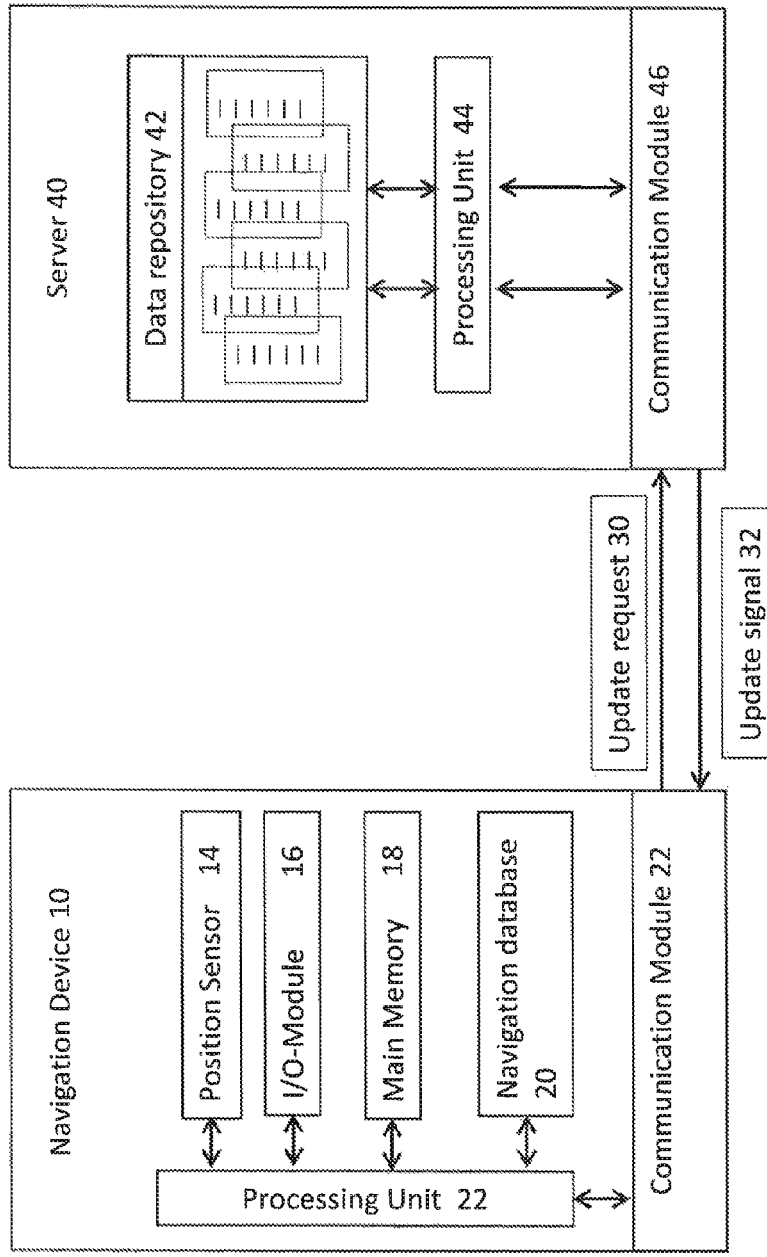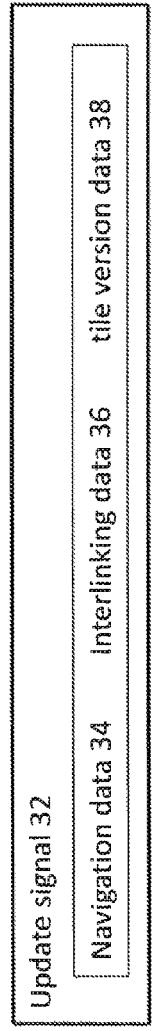
Fig. 12a
Fig. 12b

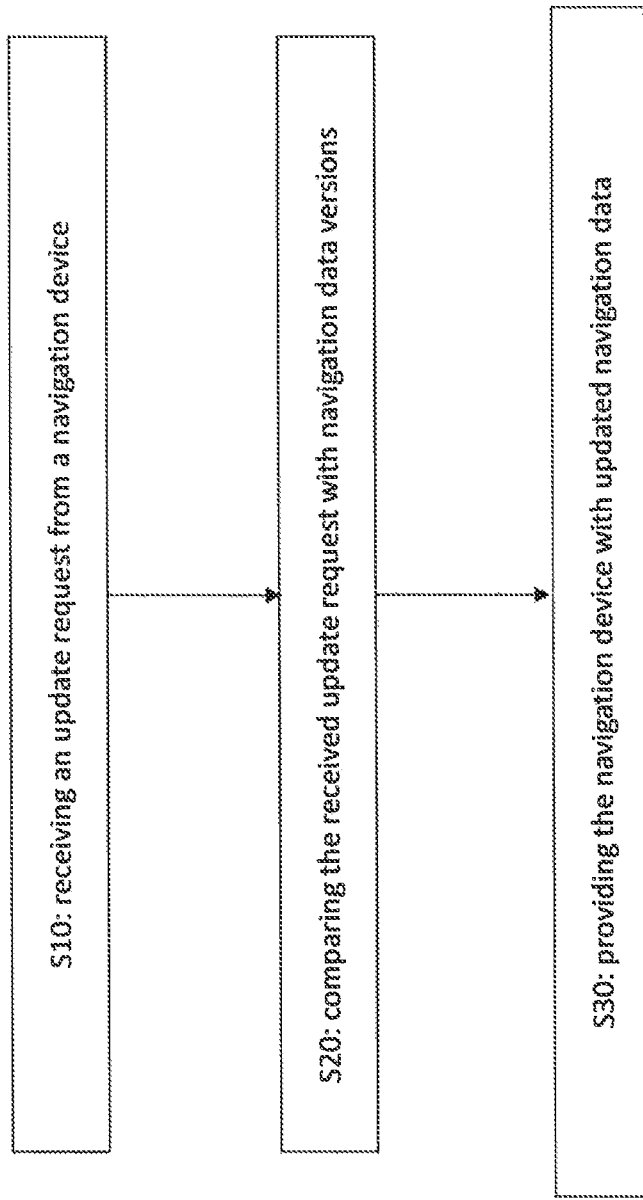

TECHNIQUE FOR STRUCTURING NAVIGATION DATA

TECHNICAL FIELD

The present disclosure generally relates to navigation-related aspects. In particular, the disclosure relates to a technique of structuring a navigation database content for efficiently performing updates.

BACKGROUND

State of the art navigation devices provide a large amount of useful information and search options regarding routes to be travelled, Point Of Interests (POIs) in the vicinity of calculated routes or in the vicinity of a device position, names of cities, streets or buildings, traffic information and so on. Depending on the services the navigation device is going to provide, navigation devices store large amounts of navigation data associated with, for example, routing, map displaying, destination entry, POIs, traffic information in their databases.

One problem related with state of the art navigation devices consists in efficiently updating large navigation databases. In practice, routing data, destination entry data, map display data, POI data, etc. have to be regularly updated in order to take into account continuous changes in the road network, POI network, and so on. However, since stored navigation data are highly interlinked (especially destination entry data, routing data and map display data) and since the database design has to take into account limited computational power of mobile or embedded navigation devices, a database update generally ends up with replacing the whole dataset or large data blocks of the dataset.

In current solutions large updatable data blocks comprise navigation data associated with large geographical areas, such as (federal) states (e.g., California), countries, group of countries (e.g., BENELUX: Belgium, Netherlands and Luxemburg), or individual continents (e.g., Australia, Europe). A partial or incremental update, in which a sub-set of an updatable data block is replaced (for instance, a data sub-set representing a local geographic area of 40 km×40 km (called local tile hereinafter) is—for consistency reasons of the whole database—hardly possible. The reason for this is the fact that navigation data elements within the database are highly interlinked so that replacement of individual data elements within one or more data sub-sets associated with local geographic areas may entail navigation data modifications of the whole updatable data block or database.

Further, navigation data and navigation systems are often provided by different suppliers. Thus, state of the art navigation systems generally use proprietary navigation data formats. Consequently, navigation data suppliers have to provide navigation data and update packages for all data formats being on the market, causing high efforts and costs on the side of the navigation data suppliers.

A further problem associated with state of the art navigation devices and navigation databases is that, even in case a navigation device supports limited data updates in form of patch updates, the patch history might depend on the navigation device supplier and, therefore, it might vary for each navigation device. In order to provide each individual system with appropriate patches, a patch history has to be recorded and provided to a corresponding navigation data server. Complex patch histories, however, comprise an increasing amount of data and require additional hardware resources, such as additional storage resources on the navigation system, transmission resources, and so on. Further, with individual patches, the variance of navigation databases increases, and testing for qualification of patches as well as diagnosis of errors occurring on individual systems becomes increasingly complex and expensive.

In order to simplify the provisioning and updating of navigation data, a navigation system independent physical storage format has been developed by Navigation Data Standard (NDS) e.V., a registered German society of car manufactures, navigation system suppliers and map suppliers. The NDS format allows a more flexible updating of NDS databases and supports data retrieval from different data suppliers and via different distribution channels without losing database consistency. However, incremental navigation data update on local (e.g., tile) basis is presently not supported by NDS.

SUMMARY

It is an object to provide an improved navigation database structure and an efficient navigation data update procedure.

According to one aspect, a method of structuring navigation database content in order to support incremental data updates is provided. The method comprising the steps of providing at least two data levels, wherein a first data level is associated with route links representing road segments of regional distance roads; partitioning the first data level into local tiles, wherein each local tile is associated with route links representing road segments of regional distance roads associated with a specific local geographic area; and establishing an interlinking between route links of neighboring local tiles that represent a road segment of a regional distance road extending over the corresponding neighboring local tiles.

The technique presented herein may be implemented in an NDS context or in the context of any other navigation data and/or map standard. It will thus be appreciated that when NDS specific expressions are used herein, the expressions are not be construed as being limited to NDS entities but also encompass corresponding entities of any other standard.

Local tiles may represent local territorial areas subdividing larger geographic areas or navigation update regions, such as states, countries, country groups or continents, as provided by common navigation databases. Local tiles thus may represent a further partitioning of larger geographic areas (or update regions) into local territorial sub-units (e.g., according to a predetermined tiling scheme). The tiling scheme may determine the size and shape of the local territorial sub-units. The tile partitioning of an update region may be performed such that the whole update region may be covered in its entirety by a predetermined amount of tiles (e.g., arranged in a net-like manner without overlapping). The tile size may be chosen such that the amount of navigation data associated with an arbitrary tile remains easily manageable by navigation devices.

According to one realization the tiling scheme may be a local tiling scheme (having local tile identifiers); according to another realization the tiling scheme may be a global tiling scheme (having global tile identifiers); for instance, the global tiling scheme as provided in NDS may be used in order to provide local tiles.

The navigation database content may be partitioned in exactly two hierarchical data levels or in three or more hierarchical data levels. Further, a second data level may be associated with route links representing far distance roads. The route links within the second data level may be organized independently of a structure of local tiles in the first data level. Each data level may represent a database subset associated with route links of certain road categories.

"Far distance roads" may comprise principal roads of a road network and/or roads connecting far distanced cities or destinations. For instance, far distance roads may comprise roads of one or more predefined functional classes above a given priority such as functional classes FC0 and FC1 (e.g., highways, dual carriageways). "Regional distance roads" may comprise regional and/or local roads. Regional distance roads may be roads of one or more functional classes below a given priority, such as functional classes FC2, FC3, and FC4. Hence, the first data level may comprise all route link data associated with regional distance roads, whereas the second data level may comprise all route link data associated with far distance roads. Route link data may comprise at least one of route link attributes, route topology data and route geometry data. The two data levels may be further partitioned into sub-levels, each sublevel being associated with route links of a specific road functional class. Of course, the road assignment to data levels may be also performed in a different way.

The step of partitioning the first data level into local tiles may comprise the steps of splitting route links representing road segments extending over at least more than one tile up into distinct route links, providing the distinct route links with route link data for (e.g., fully) representing the road segments extending over neighboring tiles within the corresponding tiles, and assigning the distinct route links together with route link data to the corresponding local tiles. The splitting up of route links associated with road segments extending over more than one tile may ensure that each tile is merely provided with route links lying within the tile borders. Each split up route link may further comprise the full link information (e.g., top( )-logic and geometric information) for the corresponding tile road segment. Thus, the splitting up of route links and storing of split up route links together with their topological and geometric link information may ensure that even related split up route links of neighboring tiles associated with the same extending road segment in the real road network are topologically and geometrically independent from each other.

The step of interlinking route links of neighboring tiles may comprise organizing route links representing road segments of roads extending over neighboring tiles into at least one special routing cluster. Route links of the at least one special routing cluster may be organized in a route link table with fixed route link order. Fixed route link order may mean that the link order may be preserved during (incremental) database update. In detail, the link number and link position within the table may remain unaffected by a database update. In this context, new split up route links added during an update to the at least one special routing cluster may be associated with a new table position and table number. Accordingly, the position of deleted route links may not be replaced in order to preserve the route link order.

Each route link may be provided with an identifier. The identifier may be a permanent identifier corresponding to the fixed route link number. The permanent identifier (e.g., fixed route link number) may be used in order to interlink related split up route links of neighboring tiles. For instance, an interlinking between split up links of neighboring tiles can be established by referencing from one split up link of a tile to the corresponding split up link (i.e., related split up links) of neighboring tiles using their permanent identifiers. Since the permanent identifiers remain unchanged by an (incremental) update, interlinking consistency between neighboring tiles may always be preserved even in case only one of two neighboring tiles is updated.

In this context and in the following description, with the wording "interlinking consistency" it may be meant that the general interlinking capability of the above mentioned interlinking scheme is not lost by an arbitrary one-sided tile update, since the identifiers (or route link numbers) of the split up route links to be linked with each other and, consequently, the uniquely defined reference relations between related split up route links being linked with each other remain invariant even in case of a one-sided tile update. This may also apply for defined reference relations between related split-up links of neighboring tiles, in which, for instance, due to an one-sided tile content update one of the related split-up links is deleted in the updated tile, since in such a case the corresponding "space" in the special routing cluster is kept free and is not occupied any more with another (unrelated) split up route link.

Alternatively or in addition, the step of interlinking may comprise providing each local tile with tile knots and tile knot identifiers and associating split up route links to be interlinked with corresponding tile knots of the local tiles. For this purpose, related split up links of neighboring tiles to be interlinked may each be assigned to tile knots with the same tile knot identifier. Each provided tile knot may reference split up route links located in neighboring tiles that have to be interlinked by a routing algorithm. Thus, a tile knot may mediate a linkage between split up links of neighboring tiles to be interlinked.

The tile knot identifier may be a permanent identifier that may remain unchanged during an (incremental) database update. Each local tile may be further provided with at least one knot identifier table representing an assignment between the corresponding tile knot and split up route links (i.e., between the permanent knot identifiers and split up route link identifiers). The route link identifiers may or may not change with (incremental) database updating. Since the knot identifier table provides an unambiguously relation between the permanent tile knot identifiers and the split up route links for each tile, interlinking consistency between neighboring tiles may always be preserved (provided that the tile knot identifier table is replaced by an updated tile knot identifier table during an update) even in case split up route link identifiers of one of two neighboring tiles have been changed during an (incremental) database update.

Also route links associated with road elements completely lying within a tile may be organized into at least one routing cluster. Each route link may at least comprise the topological, geometric and route link attribute information. The route links within the clusters may be organized in a route link table. Each route link may further be provided with a route link number, representing the position of the route link within the route link table. The position of route links within the table may be variable. For instance, the position of one or more route links within the table may be newly defined with each (incremental) database update.

The size and/or number of routing clusters may be predetermined or variable. The cluster size may depend on the number of route links to be organized within a corresponding local tile. The size and/or number of routing clusters may depend on the route link density (i.e., number of route links per tile). For instance, tiles covering large cities with a dense road network may be provided with larger routing clusters and/or larger number of routing clusters. In this context, a cluster may comprise at least one route link. Independent of the number and size of routing clusters within a tile, each routing cluster may be provided with a cluster identifier (cluster ID) via which a cluster is assignable to a tile.

Route links associated with the at least two data levels may be further interlinked. The interlinking between the at least two data levels may ensure that route links of an entire road network (comprising far and regional distance roads) may be connected appropriately. According to one interlinking scheme, the at least two data levels may be provided with level knots and level knot identifiers. Route links associated with the first data level may be interlinked with route links associated with the second data level by assigning related route links of the different levels to corresponding level knots with the same identifier. For both data levels the assignment between level knots and corresponding route links to be interlinked may be stored in a first and second identifier table. The first identifier table may be stored in corresponding tiles of the first data level comprising route links to be interlinked, the second identifier table may be stored in the second data level. A level knot may establish a reference between corresponding (assigned) route links of the first data level and the second data level. Thus, a tile knot may mediate a linkage between related route links of the at least two data levels.

The level knot identifier may be a permanent identifier. The permanent identifier may remain unchanged during an (incremental) database update. The route link identifiers may or may not change with (incremental) database updating. In case route link identifiers are changed during update the first and/or second identifier table may have to be replaced by a new identifier table comprising the new route link identifiers during update. As the level knot identifier remains invariant, interlinking consistency between both data levels may always be preserved (provided that the corresponding identifier tables are replaced during (incremental) update).

The navigation database content may further comprise at least one of basic map display data, destination entry data, Point Of Interest (POI) data, TMC data and further enhanced navigation data, such as digital terrain models, orthoimages, full text search, speech data, 3D data and so on. Basic map display data may comprise pre-generalized road geometry data for map displaying and may optionally be stored in the database for both data levels (e.g., far distance road level and regional distance road level) separately.

Destination entry data of the navigation database comprising destination entry elements for roads, places, cities, etc. may also be partitioned in accordance with the at least two data levels, wherein Local Destination Entry (LDE) data are associated with the first data level and Global Destination Entry (GDE) data are associated with the second data level. GDE data may comprise destination entry indices for far distance roads as well as destination entry indices for cities or city parts. LDE data may comprise destination entry indices for local and/or regional distance roads. Destination entry indices associated with regional distance roads may be further partitioned in accordance with the local tiles. In detail, destination entry indices providing Next Valid Character (NVC) trees for local roads (places etc.) may be split up into multiple NVC trees. Each tree may represent road names associated with roads of a corresponding local tile. Thus, the destination entry data for local roads fully correspond with route link data for each tile. In order to support an NVC functionality on basis of destination entry data for a city, multiple NVC trees split up in accordance with the local tiles can be merged by a navigation application on the fly.

The navigation database may further comprise POI data as well as POI index trees for a POI-NVC functionality. POI data may be partitioned in accordance with the at least two data levels. In detail, POI data may be partitioned into global POIs assigned to the second data level associated with far distance roads and local POIs assigned to the first data level associated with regional distance roads. The global POI data as well as local POI data may be interlinked with far distance road data and/or regional distance road data, respectively. In such a case the global POI data and the local POI data may be updated together with the far distance road data and/or regional distance road data, respectively. Alternatively, the POI data may be organized independently from the routing data. For instance, POI data may be organized within a single data block or according to predefined POI categories into several data blocks. In such a case, POI data may be updatable independently from the other navigation data. In order to provide a linkage between POI data and corresponding route links, POI data may be provided with position data, and a nearest-edge-search may be applied on basis of the position data.

Each local tile may further be provided with a unique tile identifier. The tile identifier may be used in order to unambiguously assign data structures, such as routing clusters, special routing clusters, permanent identifier tables etc. to a corresponding tile. Thus, when updating data content of a local tile or portions thereof the tile identifier may be used for addressing the appropriate data to be updated.

Each local tile may be further provided with tile version data. Tile version data may comprise an update history for each local tile or an update date of the last update. The update history may comprise data version numbers of the last tile updates. Based on the update version data, a navigation data supplier decides whether or not a tile update is required.

On basis of the above described data structuring and data interlinking each local tile may represent a self-contained navigation database sub-structure that is structured to be individually updatable without losing consistency of the (entire) underlying navigation database. "Self-contained" may mean that each tile may comprise all navigation information about at least the geometry, topology, names and attributes of regional distance road segments associated with the corresponding tile. Hence, changes in the real regional road network only cause navigation data modification in the corresponding tiles. Modifications associated with a local tile do not require navigation data modifications or adaptions in neighboring tiles.

Also provided is a method of incrementally updating a navigation database of a navigation device, wherein the navigation database is structured in accordance with the database structure discussed above. The updating is performed by a navigation data server and comprises the steps of receiving an update request from the navigation device; and providing the navigation device with updated navigation data on a local tile basis.

The update request may comprise information about current navigation data versions in the navigation database. For instance, the information may comprise navigation data version information associated with at least one local tile. Alternatively or additionally, the information may comprise navigation data version information associated with the second data level. The received information may further be compared with navigation data versions (navigation data versions for single tiles and/or the second data level) available on the navigation data server. The comparison may be performed in a tile-wise manner.

Depending on a result of the comparison, updated navigation data may then be provided. The provided navigation data may comprise updated routing data for the at least one local tile to be updated and updated interlinking data. In case the local tiles are further associated with one or more of basic map display data, destination entry data, POI data and enhanced navigation data, the provided navigation data may further comprise one or more of updated basic map display data, destination entry data, POI data and enhanced navigation data. In addition, the updated interlinking information may comprise updated identifier tables in order to maintain connectivity between updated route links in the updated tiles and not yet updated route links of neighboring tiles and/or the second data level.

Each tile of the first data level may be individually updatable. Since each tile merely comprises tile-specific navigation content, and since the connectivity between tiles and data levels is provided, for example, by the first and second identifier tables or special routing clusters, each tile can be individually updated without risking database consistency loss after an incremental update.

Further, the first data level and the second data level may be updated independently from each other. Alternatively, the first data level and the second data level may be updated together. In contrast to the first data level update performed on tile basis, the navigation content associated with the second data level may be updated as a whole, i.e., by replacing the whole navigation content associated with the second data level.

Provided is also a computer program product with program code for carrying out the structuring technique described herein when the computer program product is executed on a computer device. For this purpose, the computer program product may be stored on a computer-readable recording medium (e.g., a memory card or a read-only memory).

Also provided is a navigation database structured in accordance with the structuring technique described herein.

Also provided is a navigation device comprising the navigation database structured in accordance with the structuring technique described herein.

Still further, a data signal for incrementally updating a navigation database of a navigation device is provided, wherein the navigation database is structured in accordance with the structuring technique described herein. The data signal may be provided by a navigation data server. The data signal comprises updated navigation data comprising at least updated routing data for at least one local tile of the first data level; and updated interlinking data for the at least one local tile to be updated in order to ensure connectivity between the at least one updated local tile and the remaining unchanged navigation data of the navigation database.

The data signal may further comprise at least one of destination entry data, basic map display data, POI data and other enhanced navigation data for the at least one local tile of the first data level. The data signal may also comprise updated tile version data.

The updated interlinking data may comprise at least one identifier table at least including an assignment between tile route links of the first data level to be interlinked with route links of the second data level and corresponding tile knots on both levels.

The update navigation data may further comprise updated navigation data and interlinking information in form of a (permanent) identifier table for the second data level.

BRIEF DESCRIPTION OF THE DRAWINGS

Further details, advantages and aspects of the present disclosure described herein are given by the following drawings, wherein:

FIG. 6 illustrates navigation database structuring in accordance with one embodiment;

FIGS. 7a-7c schematically show route link partitioning in accordance with the navigation database structuring illustrated in FIG. 6;

FIG. 12a/12b schematically illustrates navigation data updating in accordance with one embodiment of the present disclosure; and FIG. 13 illustrates a flow diagram of a further method embodiment.

DETAILED DESCRIPTION

In the following description, for purposes of explanation and not limitation, specific details are set forth, such as specific navigation database structures and specific signaling scenarios, in order to provide a detailed understanding of the present disclosure. It will be apparent to one skilled in the art that the technique presented herein may be practiced in other embodiments that depart from these specific details. For example, while the following description will primarily relate to NDS, it will be readily apparent that the techniques presented herein can also be applied in the context of other navigation data or map data standards.

Those skilled in the art will further appreciate that the methods, steps and functions explained herein may be implemented using individual hardware circuitry, using software functioning conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores one or more programs that control the processor to perform the steps discussed herein when executed by the processor.

In the following the NDS database design (as one of many navigation or map database designs) will exemplarily be explained in more detail in conjunction with the schematic illustration in FIG. 1. As will be explained in greater detail below, the technique presented herein may in one embodiment be implemented in an NDS context.

Figure 1:
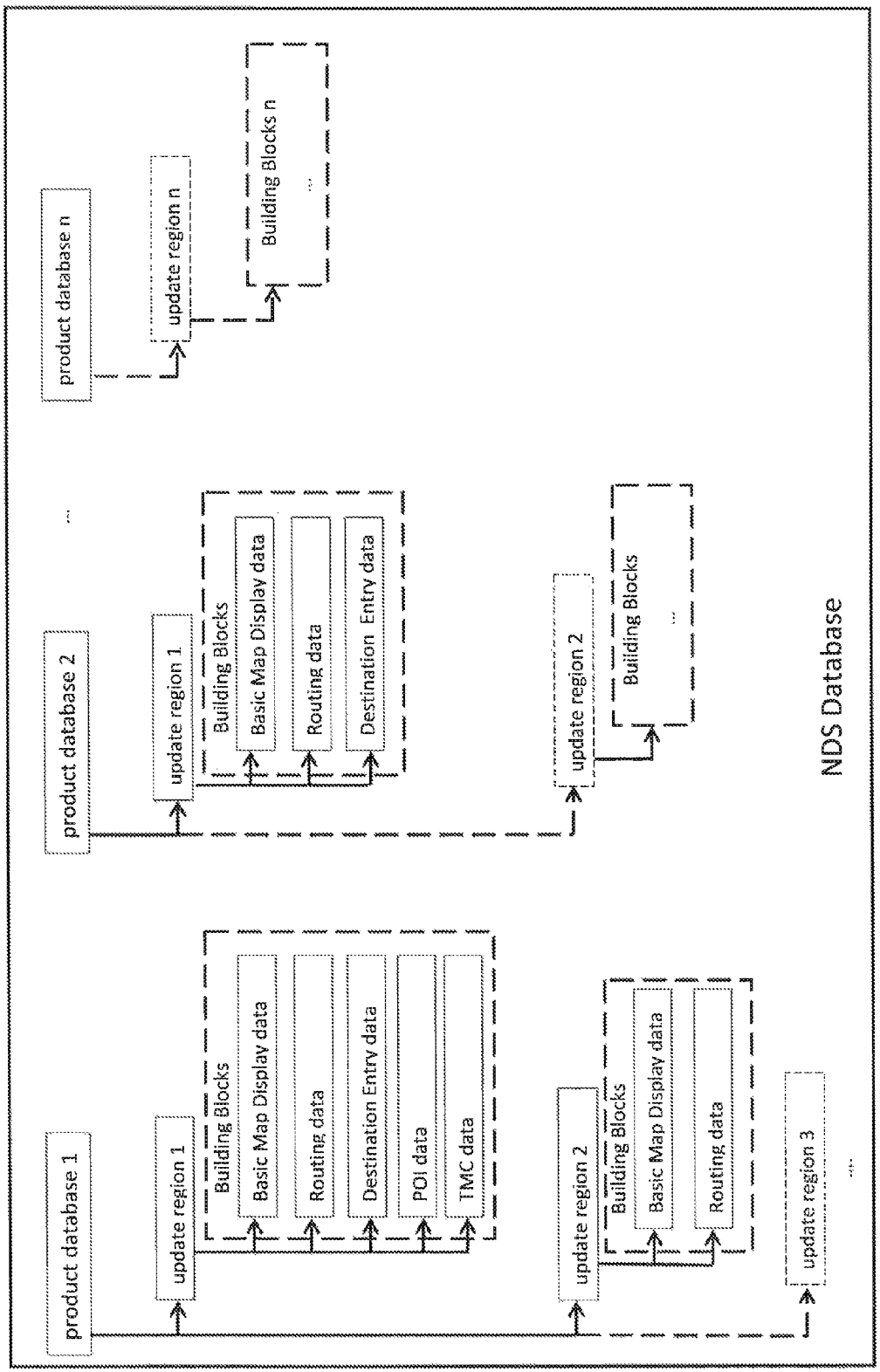
FIG. 1 schematically illustrates a navigation database according to Navigation Data Standard, NDS, specifications.

FIG. 1 shows a navigation database in accordance with NDS. The NDS database comprises several product databases 1, 2, . . . , n supplied by one or different data suppliers. Each product database is further organized into several update regions 1, 2, 3, . . . , n, wherein each update region is designed to comprise all navigation data associated with specific large geographic areas. For instance, for a product database covering the geographic region Europe, the individual update regions may comprise navigation data of individual European countries, such as Germany, Poland, etc., or country groups, such as Scandinavia (i.e., Finland, Norway and Sweden). Each update region is configured to be separately updatable and the number of update regions may vary from one product database to another product database.

The navigation data associated with each update region are further organized into different building blocks. A building block is defined by navigation data of a specific type, such as basic map display data, routing data, destination entry data, POI data, TMC data and so on. The number of building blocks for a specific update region may depend on the data supplier. An update region may only comprise basic navigation data, such as basic map display data, routing data and destination entry data or additionally enhanced navigation data, such as POI, TMC, digital terrain models, orthoimages, full text search, speech, etc.

At least the routing data are further organized into so-called data levels and tiles. The level and tile structure according to the NDS specifications will now be discussed in more detail in association with FIGS. 2a and 2b.

Figures 2A, 2B:
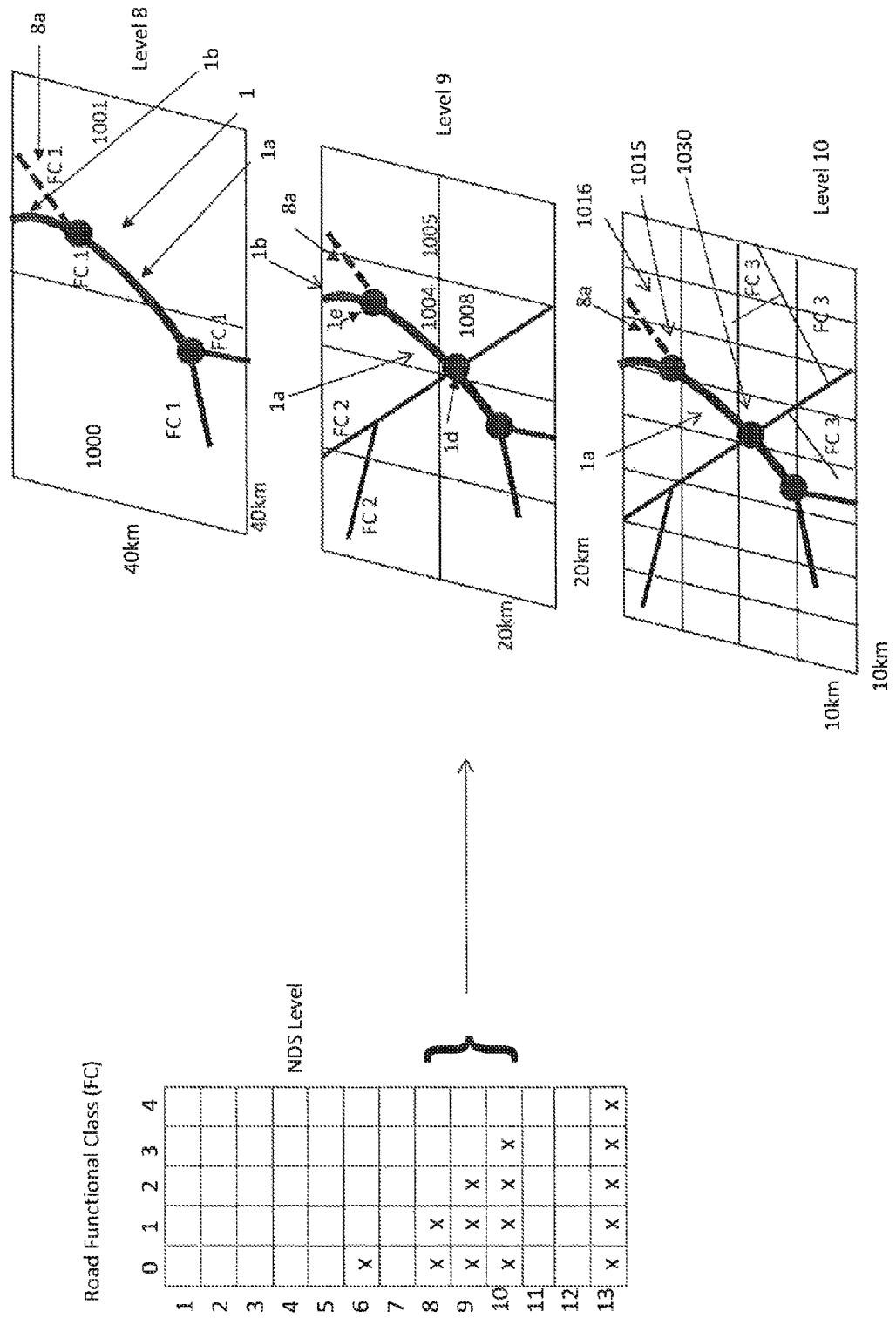
FIG. 2a/2b shows an organization of navigation data into data levels and tiles according to NDS specifications.

The table in FIG. 2a shows a mapping between NDS data levels and road Functional Classes (FC). According to international classification standards roads are usually classified into five road Functional Classes. For instance, far distance roads, such as highways or dual carriageways are classified as FC0 or FC1 roads, whereas regional and local roads are classified as FC2-FC4 roads. NDS specifies thirteen routing data levels (levels 1 to 13) and assigns roads of predetermined road FCs to specific NDS levels. As shown in FIG. 2a (cf. crosses) Level 13 is defined as base level comprising routing data of the entire road network of an update region. In other words, Level 13 has the highest road network resolution comprising roads of all five road Functional Classes. The road network resolution continuously decreases with decreasing level number. For instance, data levels 10, 9, 8 and 6 represent road networks of lower resolution merely comprising FC0-FC3 roads, FC0-FC2 roads, FC0-FC1 roads and FC0 roads, respectively.

Thus, the above mentioned NDS data levels are associated with navigation data representing road networks of predetermined resolution. At this point it should be noted that NDS data levels partially replicate routing information of lower numbered levels in subsequent higher numbered levels. For instance, as shown in FIG. 2b (cf. illustrated route links representing portions of a corresponding road network in NDS levels 8, 9, 10), data Level 8 merely represents FC0 and FC1 roads (in FIG. 2 only FC1 roads are shown) of the corresponding road network, whereas data Levels 9 and 10 represent a more detailed road network also comprising regional and local roads (FC2 and FC3 roads together with FC0 and FC1 roads). In summary, the NDS level concept redundantly replicates routing data in different data levels.

Further, as also shown in FIG. 2b, each level is additionally divided into tiles with predetermined size. A tile represents a database sub-structure comprising routing data of a specific NDS level and of a specific local geographic area of an update region. According to NDS specifications, the tile size (i.e., the size of the local geographic area associated with the tile) varies with the NDS level number, wherein the tile size continuously increases with decreasing level number. For instance, Level 13 is sub-divided into tiles representing rectangular geographic areas of 2.5×2.5 km. The subsequent lower Level 12 is already provided with tile sizes of 5 km×5 km, Level 11 with tile sizes of 10 km×10 km, etc. Thus, for each subsequent lower numbered level the tile size has been quadrupled. However, although the tile size continuously increases with decreasing NDS level number, the corresponding database sub-structure size remains manageable by the navigation device as the road network resolution (and, therefore, the amount of route links) decreases with lower levels. In summary, a level tile represents a database sub-structure unit that is easily manageable by a navigation device with limited computational power, i.e., easily loadable into a navigation system main memory for further processing by a navigation system application.

Figure 3A:
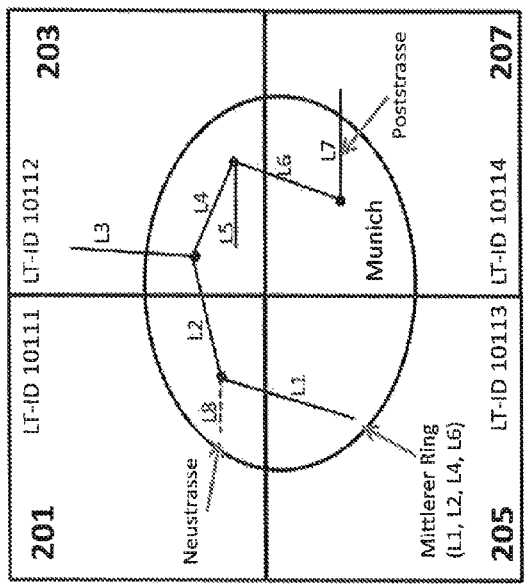
FIG. 3a/3b schematically illustrates the navigation database structure as illustrated in FIG. 1 in association with the tile concept of FIGS. 2a/2b.
Figure 3B:
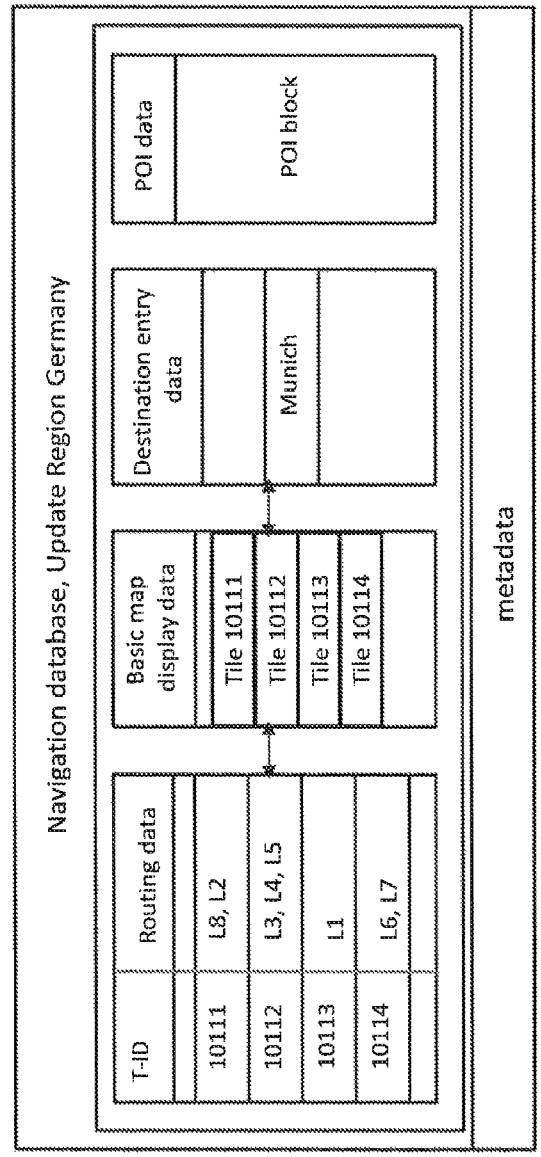

With reference to the schematic illustrations in FIGS. 3a and 3b, the organization of the NDS database in conjunction with the tile concept is further explained. FIG. 3a exemplarily represents four tiles 201, 203, 205, 207 of NDS Level 9 of update region Germany, wherein the four tiles cover a local geographic area around Munich. For clarity reasons, the city and some major roads are only schematically illustrated.

FIG. 3b illustrates the structure of the NDS database for the update region Germany. The NDS database is designed as SQLite database comprising metadata and navigation data in form of binary data structures. The navigation data are stored as basic map display, routing, destination entry, and POI building blocks. Basic map display data and routing data are further organized according to the level 9 tile structure. In detail, routing links (i.e., routing links associated with road segments L1, L2, L3, L4, L5, L6, L7 and L8) lying within the local tiles 201, 203, 205, 207 are stored in corresponding tile blocks. Routing links (L1, L2, L6) extending over tile borders are stored in the tile block in which the links have their starting point. Further, each tile block is associated with a unique tile identifier (cf. T-ID 10111, 10112, 10113, 10114) via which the route links are addressable. For the configuration shown in FIG. 3a, route links L8, L2 are stored in tile block 10111, route links L3, L4, L5 in tile block 10112, route link L1 in tile block 10113 and route links L6, L7 in block 10114.

The organization of the basic map display data within the basic map building block is equivalent and will not discussed further at this point. The arrows between the basic map display building block, routing building block and destination entry building block in FIG. 3b symbolize that the navigation data of the corresponding building blocks are interlinked. For instance, road geometry data stored in the map display building block may be referenced by route links stored in the route building block (and vice versa) in order to allow a graphical representation of the corresponding road segment.

The metadata block comprises data that apply to the whole database and that are common to all building blocks. Details about the organization of the metadata can be found in the corresponding NDS guidelines.

Regarding the data organization of the POI building block, NDS suggests a physical separation from the basic navigation building blocks (i.e., routing data, basic map display data, destination entry data) and a monolithic data structure design. That means, POIs are stored and organized into larger data blocks comprising all POIs or POIs of predefined classes (for instance, gas station, restaurant, museum, etc.) for the whole update region. The missing interlinking between routing data and POI data allows a POI updating independently from the other navigation data. However, the monolithic design of the POI data blocks still requires a POI update that usually consists in exchanging the whole POI data set or at least POI data associated with a predefined POI class that are stored as separate data block unit.

Similar to POI data structuring, the destination entry data are organized and stored as monolithic data block. As schematically illustrated in FIG. 3b, all destination entry data associated with a Named Object "Munich" (for instance, street names, house names, etc.) are stored as monolithic data block independently of the tile segmentation shown in FIG. 3a. In other words, the destination entry data, although closely interlinked with corresponding routing data and basic map display data, are not organized into tile-dependent data sub-structures.

Figure 4:
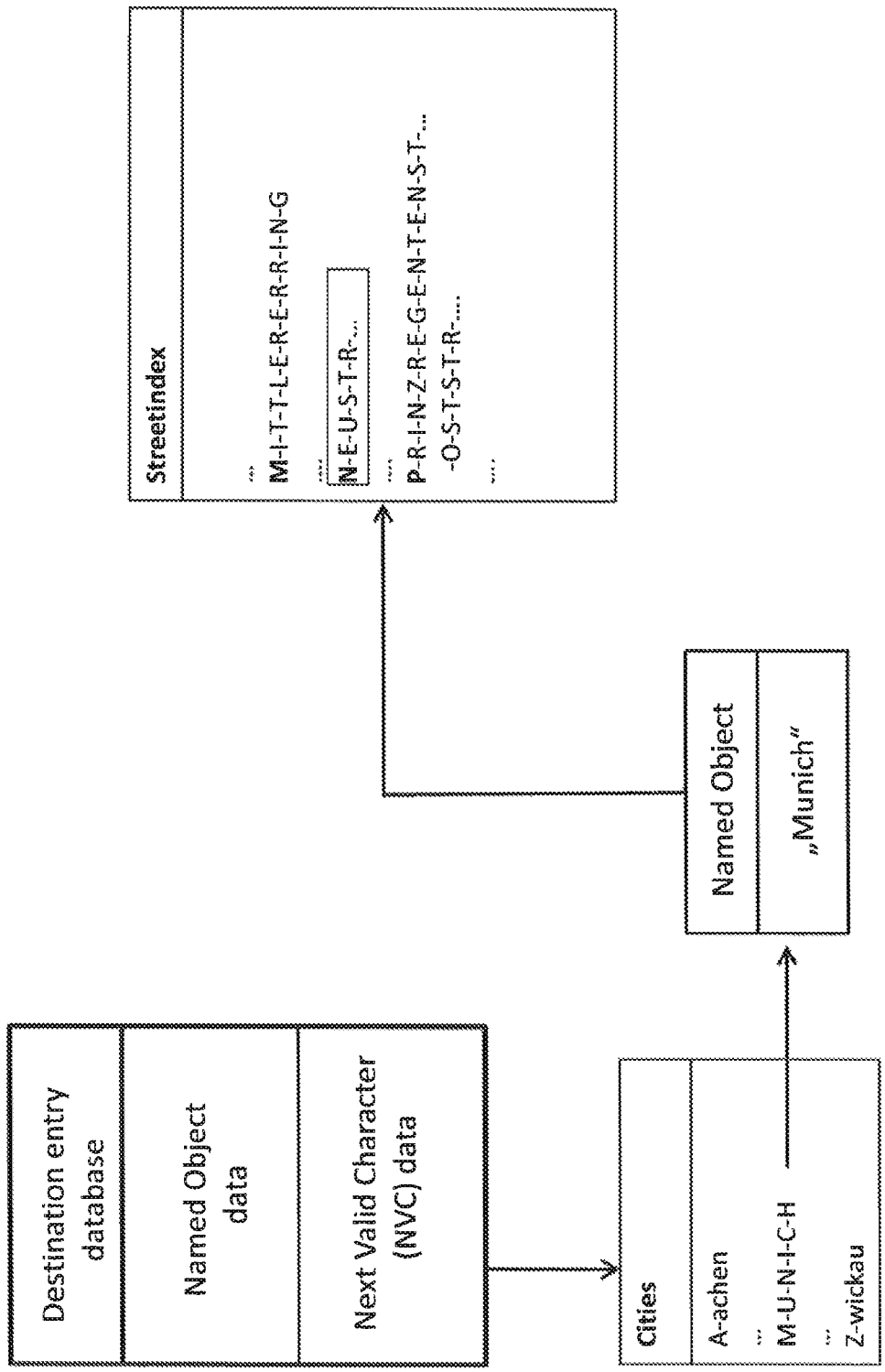
FIG. 4 schematically illustrates a navigation database structure for destination entry data according to NDS.

The organization of the destination entry building block according to NDS is further roughly illustrated in FIG. 4. The destination entry building block comprises Named Object data blocks and Next Valid Character (NVC) data blocks. Each Named Object represents an object of the real world, such as a city, country or road, wherein names describing one and the same object are related to each other. Named Objects are stored in tables, wherein each named object is uniquely defined by an Object ID. Named Objects are further associated with at least one NVC tree stored in the NVC data block. NVC trees are B-data structures allowing the user to stepwise select names from a large list of names by vertically traversing the B-structure when sequentially inputting letters. In FIG. 4 NVC-trees for road names associated with the Named Object "Munich" are illustrated. In case a road has been added within a specific tile (for instance, "Neustrasse" in tile 201), the whole NVC data tree has to be exchanged.

The existing NDS physical storage format offers many flexible update concepts. For instance, an update region of a product database can be updated or newly added without changing the basic database structure and without losing database consistency. In addition, single building blocks for the entire database or for single update regions can be added or updated. Building block data which are not inter-linked with routing data and map display data can be updated independently without consistency loss. However, according to the existing NDS storage format, navigation data update is performed on update region level or building block level, thus still resulting in exchange of a large amount of data. However, an update of routing data, map display data and/or destination entry data (i.e., an incremental update of the navigation database content) on basis of single tiles is at present not possible for the following reasons.

First of all, the multilevel structure in NDS causes database inconsistencies when solely exchanging a single tile of a specific level. One reason is that route link data (i.e., route link attributes, data associated with route link topology and road geometry etc.) may be associated with several levels. For instance, as shown in FIG. 2b, in case a new FC1 road (cf. thick dashed line) is introduced, corresponding route link data describing the FC1 road segment has not only to be introduced in tile 1001 of Level 8 (route link 8a), but also at least in tile 1004 in Level 9 and in tile 1015 in Level 10.

Thus, in order to obtain a consistent road network over the NDS Levels 8, 9 and 10, tiles 1001, 1004, 1015 have to be updated simultaneously.

Further, the addition of route link 8a has also consequences on the topology of route link 1 that extends over several tiles in each level. In detail, in the update data set route link 1 has to be replaced by new route links 1a, 1b (note, route link 1a is given by the line between the route nodes 1d, 1e) with different topological features. Further, according to NDS specifications the route link 1a is stored together with its route attributes in the tile on which its start point is located. Thus, at least tiles 1000, 1008, 1030 have to be further updated. Hence, the illustrated example in FIG. 2b already demonstrates how an addition of a single road may entail updating a larger data amount (i.e., navigation data of many tiles) in order to preserve database consistency.

Figure 5:
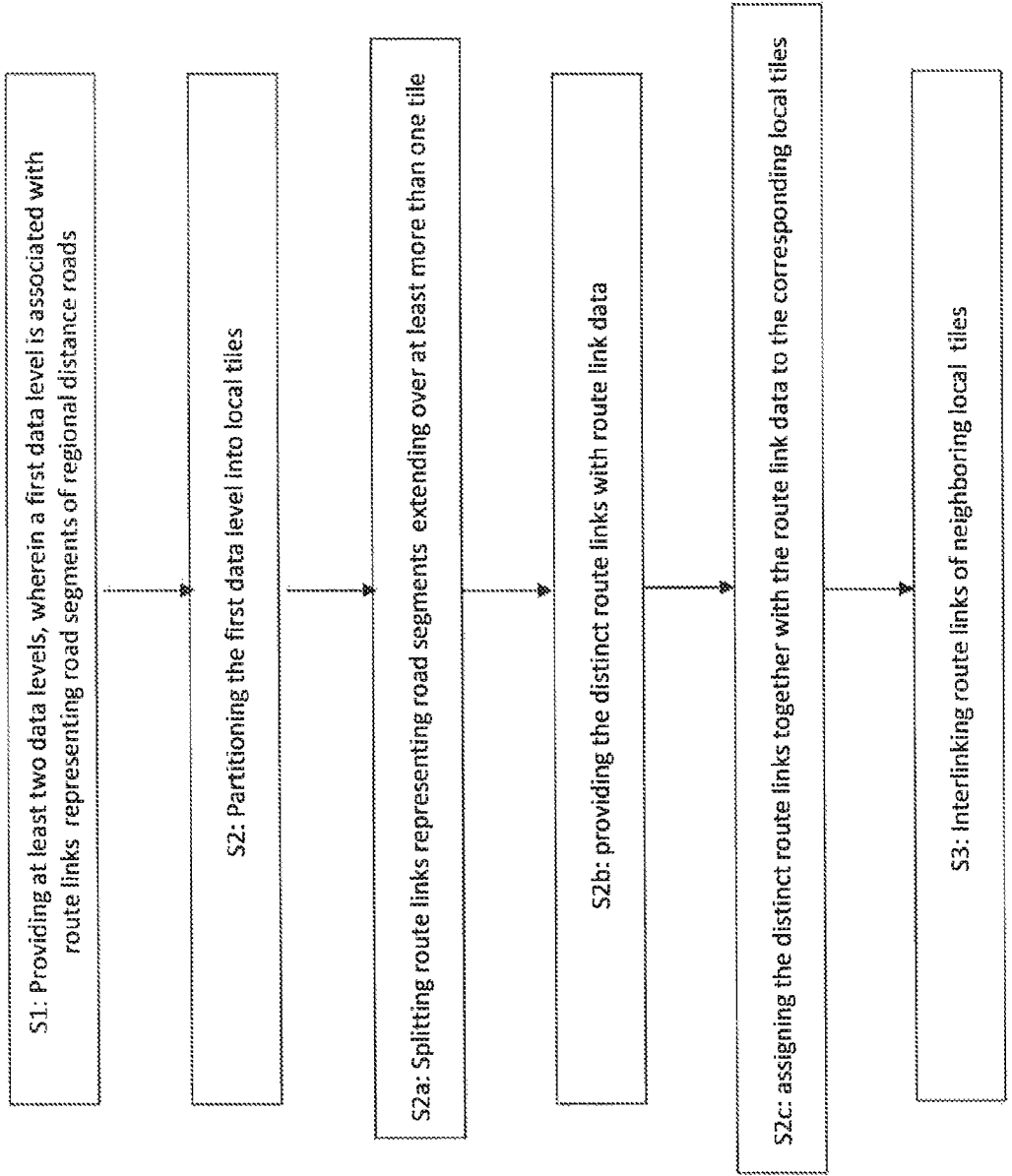
FIG. 5 illustrates a flow diagram of one method embodiment.

With reference to FIGS. 5 and 6, one embodiment of navigation database structuring in accordance with the present disclosure will now be discussed in more detail in connection with an exemplary NDS implementation. FIG. 5 shows a flow diagram of a method embodiment and FIG. 6 visually illustrates the related database structure.

In a first step (S1), routing data of a navigation database content are partitioned in accordance with a first data level 100 (denoted as Regional Distance Level, RDL hereinafter) and a second data level 120 (denoted as Far Distance Level, FDL hereinafter). According to one embodiment the RDL 100 comprises route links representing road segments of regional (and local) roads (for instance, roads that are classified according to the international road classification as Functional Class FC2, FC3 and FC4 roads). Further, the FDL 100 is associated with far distance roads connecting geographical points (cities, airports, etc.) on large distance scale (for instance, FC0 and FC1 roads, such as highways, dual carriageway roads, etc.).

The destination entry data are also partitioned into two larger data blocks which are assigned to the RDL 100 and FDL 120, respectively. In detail, so called Global Destination Entry data (GDE) comprising destination entry indices for far distance roads as well as destination entry indices for cities and city parts are associated with the FDL 120, whereas so called Local Destination Entry (LDE) data comprising destination entry indices for local and/or regional roads are associated with the RDL 100. Since destination entry data and route link data are highly interlinked within a navigation database (for instance, destination entry elements reference to corresponding route links and vice versa) a separation of GDE data from LDE data allows updating both data levels 100, 120 separately without risking consistency of the whole navigation dataset.

In addition, in case the navigation database also comprises Point Of Interest (POI) data, POI data can be also partitioned and assigned to both data levels 100, 120. For instance, as shown in FIG. 6, POIs or POI classes representing POI data associated with national or supranational service facilities such as airports, ports, etc. are associated with the FDL 120, whereas POIs or POI classes representing local POIs, such as pharmacies, hospitals, restaurants, gas station etc. are associated with the RDL 100. The global POI data as well as the local POI data may be interlinked with at least one of the FDL routing and FDL destination entry data and/or with at least one of RDL routing and RDL destination entry data, respectively. In case of POI interlinking the presented POI partitioning allows a partial POI data update by replacing POI data of that data level/tile which is currently updated. Hence, an update of the whole POI data set is not required. In case POI data are not referenced by routing data and/or destination entry data, POI data within the navigation dataset build up an independent data block. In such a case single POIs, groups of POIs, single POI classes or all POIs may be updated separately and independently from the routing data or destination entry data in the navigation database 20.

With reference to FIGS. 5 and 7a-7c, the RDL and FDL structuring will be described in more detail.

In a further step (S2), the RDL 100 is partitioned into local tiles 200, 201, 202, 203, 204, 205, 206, 207. A local tile 200, 201, 202, 203, 204, 205, 206, 207 represents RDL navigation data (for instance, RDL routing data, LDE data, map display data, local POI data, etc.), associated with a specific local geographic area. In other words, a local tile 200, 201, 202, 203, 204, 205, 206, 207 represents RDL navigation data and/or RDL navigation data structures for a specific geographic area of predetermined size. FIG. 7a exemplary illustrates four local tiles 200, 202, 204, 206, each local tile 200, 202, 204, 206 covering a quadratic area of 40 km×40 km as well as some RDL route links lying therein. According to the present embodiment the whole geographic area represented by the navigation database 20 (for instance, Europe, Northern America, etc.) is fully covered in a non-overlapping manner by uniform tiles of 40 km×40 km size. In this context, it is obvious, that the principles of the present invention do not dependent on the tile size. Any "reasonable" size can be chosen (for instance, tiles covering quadratic areas of 10 km×10 km, or 20 km×20 km, etc.) for further partitioning the RDL 100. "Reasonable" in this context means that the tile size is chosen such that the sizes of the data or data structures associated with each tile are easily manageable by a navigation device 10, i.e., loadable into the main memory for processing by corresponding navigation applications.

FIG. 7b schematically illustrated parts of the FDL 120 covering the same geographic area as the RDL tiles 200, 202, 204, 206 in FIG. 7a do. The corresponding geographic area portion of the FDL 120 has no tile structure. According to the present invention, the tile concept is preferably only provided for the RDL 100 but not for the FDL 120. Consequently, the navigation data associated with FDL 120 have no tile-dependent data sub-structures, as it is the case in the NDS standard.

Finally, FIG. 7c schematically illustrates the entire road network for the selected geographic area which is obtained as superposition (i.e., addition) of RDL data and FDL data. In order to calculate a route using roads of both levels 100, 120, a special interlinking scheme between FDL 120 and RDL 100 is required. The interlinking scheme will be described in detail below in conjunction with FIG. 9.

The tile partitioning of the RDL 100 is now discussed with reference to FIGS. 5 and 8.

Figure 8:
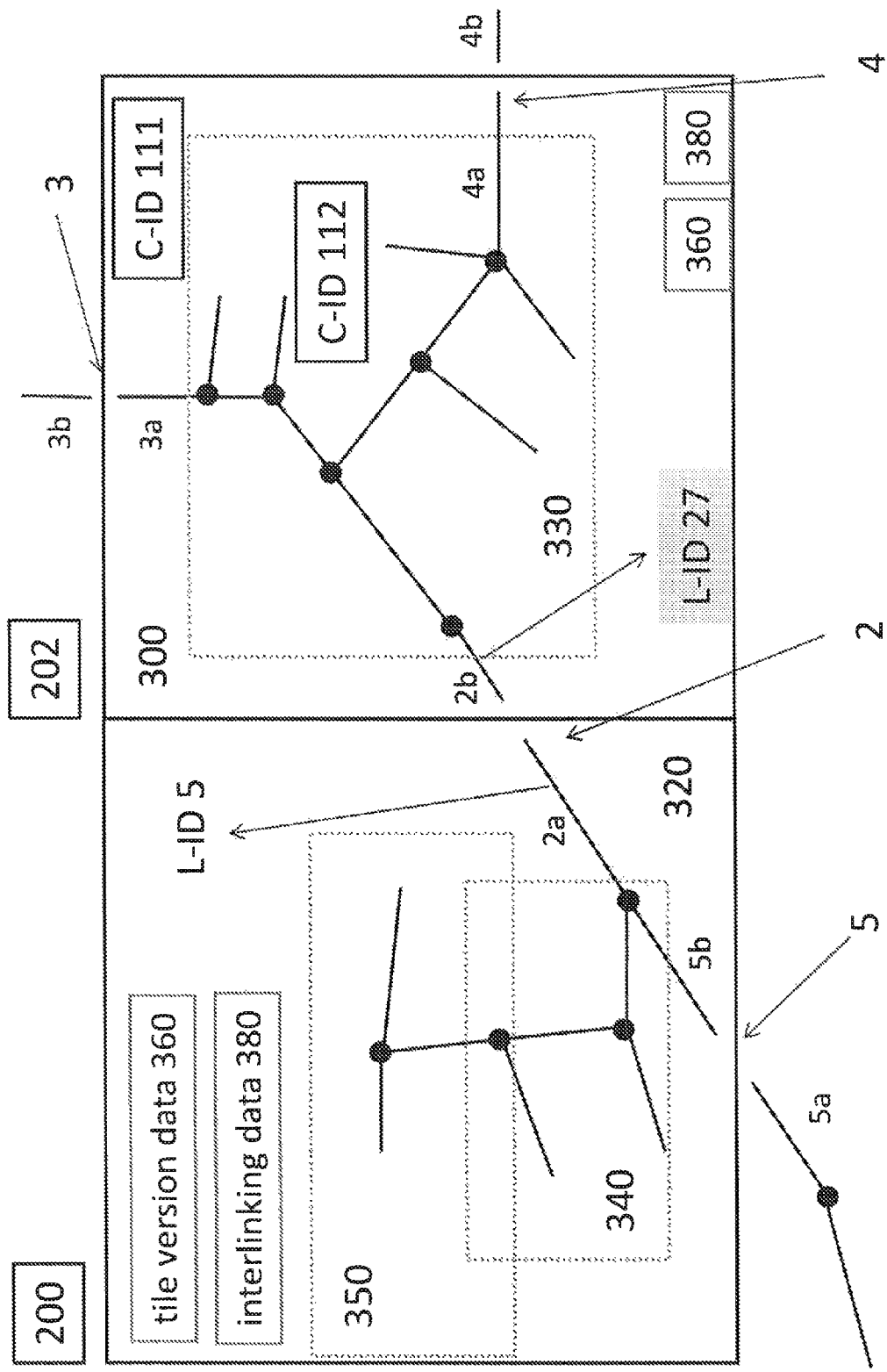
FIG. 8 schematically shows an embodiment for route link interlinking being partitioned in accordance with the embodiment shown in FIG. 6.

FIG. 8 represents the RDL tiles 200, 202 of FIG. 7a together with corresponding regional distance route links (i.e., route links representing road segments of regional distance roads lying within the tiles 200, 202). As shown in FIG. 8, both tiles 200, 202 comprise route links representing roads segments lying completely within the tiles 200, 202 and route links 2a, 2b, 3a, 3b, 4a, 4b, 5a, 5b representing road segments 2, 3, 4, 5 extending over at least one tile border (cf. route links 2a, 2b with link identifiers L-IDs 5, 27 that represent a single road segment 2 extending over the border of tiles 200, 202). The route links representing road segments within the tiles 200, 202 are stored together with route link attributes and road geometry data in the corresponding tiles 200, 202. In addition, route links associated with road segments 2, 3, 4, 5 extending over the borders of the tiles 200, 202 are additionally split up into distinct route links 2a, 2b, 3a, 3b, 4a, 4b, 5a, 5b (step 2a) and are stored together with provided route link information (for fully representing the corresponding road segment portions within the tiles 200, 202) in the corresponding tiles (steps 2b and 2c). Hence, the RDL tiles 200, 202 only comprise route links lying within the tile borders.

The splitting up of route links at the tile borders ensures that tiles are independently updatable from each other without losing navigation database consistency. In addition the cut route links 2a, 2b, 3a, 3b, 4a, 4b, 5a, 5b avoid that changes in the route link configuration and/or in the tile's route link data organization (for instance, new arrangement of route links within the route link tables, new link identifiers, etc. caused by an update procedure) also affect the route link configuration/organization of neighboring tiles. Thus, the route link splitting leads to independent navigation database sub-structures that can be modified and updated independently without risking database consistency loss.

Although the splitting of route links is advantageous for navigation data updating, problems may arise for a route algorithm when trying to calculate a route on basis of a user's destination entry and the navigation database structured in accordance with the present disclosure. The cut at the tile borders causes an interruption in the linkage of neighboring tiles. Consequently, the database sub-units have to be provided with an interlinking scheme that provides connectivity between neighboring tiles. Such a scheme will be now described in conjunction with FIG. 8.

As shown in FIG. 8 (cf. gray boxes 300, 320) the split up route links 2a, 2b, 3a, 3b, 4a, 4b, 5a, 5b of the tiles 200, 202 are further grouped to one or more special routing clusters 300, 320 (S3). For each tile 200, 202 the route links 2a, 2b, 3a, 3b, 4a, 4b, 5a, 5b are grouped such that each split up route link 2a, 2b, 3a, 3b, 4a, 4b, 5a, 5b assumes a fixed position within a relational route link table of the corresponding special routing cluster 300, 320. Further, each split up route link 2a, 2b, 3a, 3b, 4a, 4b, 5a, 5b is associated with a permanent link number (e.g., L-ID 5, L-ID 27 for route links 2a, 2b) that remains unchanged even after a tile update. Consequently, during an (incremental) update an addition of split up links to or deletion of split up links from the special routing clusters 300, 320 does not change the route link order within the special cluster 300, 320. Added route links obtain a new link number, while the position of deleted links remains unused. Due to the permanent link number it is possible to establish an interlinking between split up links 2a, 2b, 3a, 3b, 4a, 4b, 5a, 5b of neighboring tiles by referencing from one split up link to the corresponding split up link of neighboring tiles using their permanent IDs (for instance, the permanent link IDs L-ID 5 and L-ID 27 are used for establishing an appropriate connection between the tiles 200, 202). Thus, by grouping split up route links 2a, 2b, 3a, 3b, 4a, 4b, 5a, 5b into special clusters 300, 320 an interlinking scheme between neighboring tiles 200, 202 can be established that is robust against single tile update.

Alternative to the provisioning of special routing clusters, it is also conceivable to provide each tile with tile knots and corresponding tile knot identifiers (not shown in FIG. 8) and assigning split up route links 2a, 2b, 3a, 3b, 4a, 4b, 5a, 5b of neighboring tiles that have to be interlinked by a routing algorithm to the corresponding tile knots. For this purpose, each tile may be provided with a knot identifier table representing an assignment between the corresponding knot identifiers and the route link IDs of the split up route links 2a, 2b, 3a, 3b, 4a, 4b, 5a, 5b to be interlinked. Thus, via the knot identifier table the routing algorithm is able to interlink previously split up route links to represent a road segment that extends over tiles. Further, each tile 200, 201, 202, 203, 204, 205, 206, 207 is optionally provided with tile version data 360 representing the current update version of the navigation data associated with each tile 200, 201, 202, 203, 204, 205, 206, 207.

Regarding the tile knot provisioning for mediating an interlinking (i.e., connection) between related split up route links that are representing a road segment extending over at least one tile border, according to a further embodiment, the (additionally) provided tile knots are set on or close to the border of the corresponding tiles. In other words, at the tile border position at which a route link representing a road segment extending from one tile to another (neighboring) tile is split, a pair of tile knots is created wherein one knot of the pair is associated with the one tile and the other knot of the generated pair is associated with the other tile. Both knots of the pair are provided with a knot identifier. Both knots may be provided with the same knot identifier(s). The provided knot identifiers may be permanent identifiers. Permanent in this context means that the identifiers remain invariant during incremental tile update. Further, each tile is provided with an additional knot identifier table, the knot identifier table of each tile representing a unique assignment between the level knots associated with the tile and the split up route links to be interconnected. Thus, the knot identifier table uniquely references from a specific split up route link (i.e., route link ID) to a specific tile knot (i.e., the knot ID) and allows therefore a routing algorithm to associate a specific split up link with a specific tile knot when interpreting the tile knot identifier tables. Each tile knot, in turn, references to the other knot of the knot pair, which in turn references to a specific split up route link assigned to that link so that a interlinking between related split up route link is mediated by the provided tile knot pairs.

Also route links of local tiles 200, 201, 202, 203, 204, 205, 206, 207 that are not split up are further organized into one or more data clusters 330, 340, 350 as schematically illustrated by the boxes 330, 340, 350 in FIG. 8. Each cluster 330, 340, 350 may comprise a flexible number of route links, wherein the number of route links for each cluster 330, 340, 350 may vary from update version to update version. In contrast to the special routing clusters 300, 320, each route link within the cluster 330, 340, 350 may be associated with a dynamically assigned route link number (route link ID) reflecting the position of the route link within the cluster 330, 340, 350 that may change with each (incremental) update. Also the number of clusters 330, 340, 350 associated with a single tile and/or the number of routes within each cluster 330, 340, 350 is flexible and may change from update to update. Correspondingly, the size of the route link clusters 330, 340, 350 is variable. As also indicated by the overlapping boxes in FIG. 8, route clusters may overlap and/or may be nested and may comprise route links corresponding to road segments of arbitrary position within the geographic area associated with the tile. Changes or modifications of routing clusters 330, 340, 350 or of route links organized within the routing clusters 330, 340, 350 during a local tile update do not affect navigation data of neighboring tiles (and therefore the database consistency) since the data are confined to the updated local tile. In case the navigation database 20 also comprises destination entry data or map display data the corresponding data may be organized in clusters, too.

Figure 9:
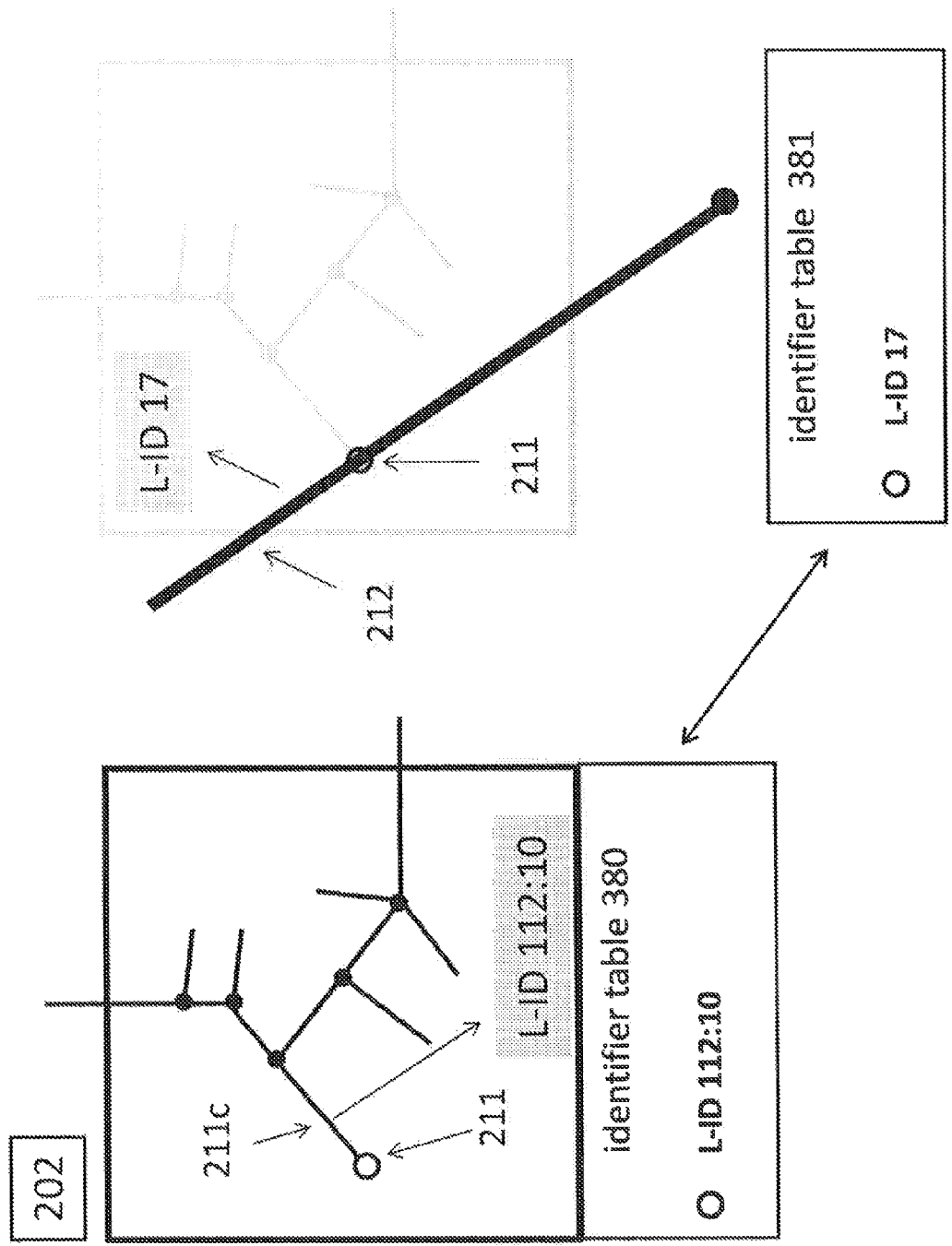
FIG. 9 schematically shows a further embodiment for route link interlinking being partitioned in accordance with the embodiment shown in FIG. 6.

FIG. 9 further illustrates an interlinking scheme for connecting FDL 120 route links with RDL 100 route links. For this purpose, FIG. 9 represents the RDL road network of tile 202 in FIG. 8 and the corresponding FDL road network (i.e. far distance road network).

Tile 202 is further provided with a level knot 211 (cf. FIG. 9 left) and a corresponding permanent level knot identifier (not shown). "Permanent" means that the stored level knot identifier does not change during (incremental) update. In addition, tile 202 is provided with a first identifier table 380 that represents an assignment between the provided level knot 211 and a tile route link 211c that has to be interlinked with related FDL route link(s). In detail, the permanent identifier table comprises an assignment between a route link identifier (L-ID 112:10) of the corresponding route link 211c and the permanent knot identifier. The level knot 211 is replicated in the FDL 120 (cf. FIG. 9 right). Also the FDL 120 is provided with a second identifier table 381 representing an assignment between the level knot identifier and a FDL route link identifier of a FDL route link 212 (L-ID 17) to be interlinked with the corresponding RDL route link 211c. By interpreting the permanent identifier tables in both levels 100, 120 the routing algorithm can interlink both related route links 211, 212. Since the level knot identifiers remain fixed during an update procedure, the interlinking between RDL tiles and FDL remains unaffected even in case the routing data of tile 202 have been modified and the route link ID of route link 211c has changed during an update. In such a case, only the first identifier table 380 has to be updated too, in order to have the correct assignment between the corresponding route link ID and the level knot ID.

Figure 10A:
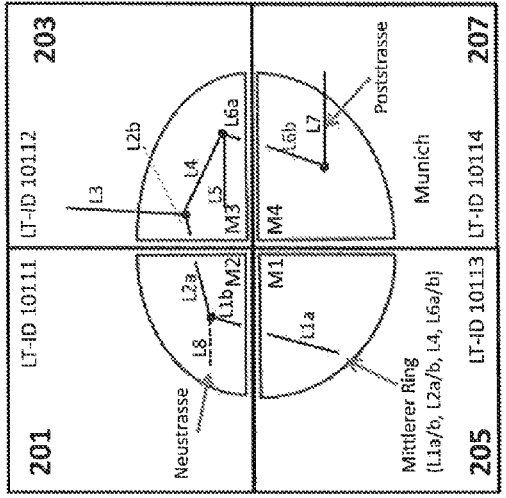
FIG. 10a/10b shows an embodiment of a navigation database in accordance with the present disclosure.
Figure 10B:
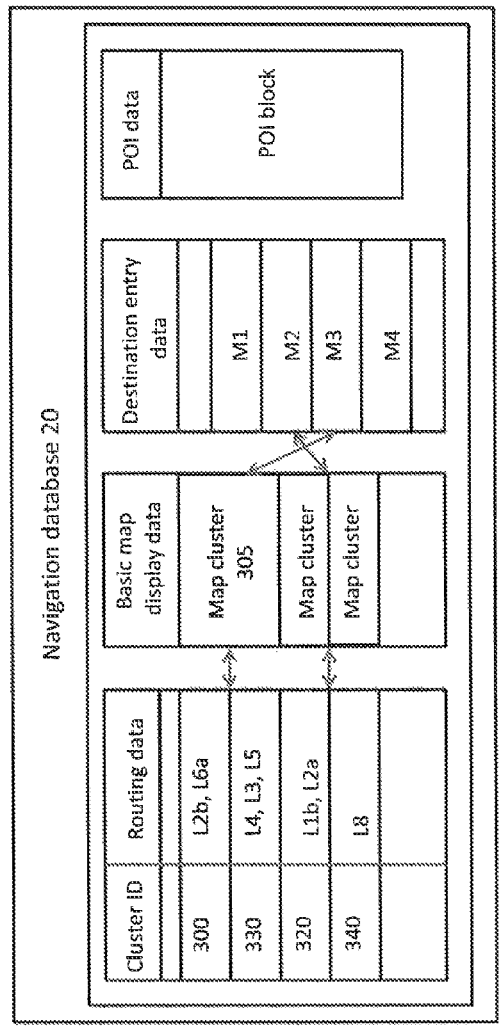

With reference to the schematic illustrations in FIGS. 10a and 10b, the organization of the navigation database content associated with the RDL 100 in accordance with the present disclosure is summarized. For clarity reasons, the FDL navigation content has been omitted in the drawings in FIGS. 10a and 10b. FIG. 10a represents the same local geographic area around Munich (and therefore, the same navigation data) as shown in FIG. 3a when discussing the NDS database structure. In contrast to the navigation data structuring shown in FIG. 3a, the links L1, L2 and L6 extending over the neighboring tiles 201, 203, 205, 207 are split up to distinct tile links L1a, L1b, L2a, L2b, L6a and L6b, respectively. Thus, each local tile 201, 203, 205, 207 is only associated with route links representing road segments lying within the corresponding tiles 201, 203, 205, 207. Further, the route links within the tiles 201, 203, 205, 207 are organized and stored into addressable clusters 300, 320, 320, 340 with predetermined cluster identifiers (cf. FIG. 10b). For instance, for tile 203, the split up route links L2b, L6a are organized within the special cluster 300 (FIG. 10b), whereas the route links L3, L4, L5 are organized within the cluster 330. Thus, routing data for each tile 201, 203, 204, 205 are stored as data structures in form of addressable data clusters 300, 320, 330, 340.

The organization of the basic map display data is analogue to the organization of the routing data. In other words, for each tile 201, 203, 205, 207 at least one addressable map cluster 305 is formed comprising data for map displaying (for instance, road geometry data, etc.). The arrows between routing data and basic map display data symbolize once again the linkage between map cluster data and routing cluster data within the corresponding tiles 201, 203, 205, 207.

Figure 11:
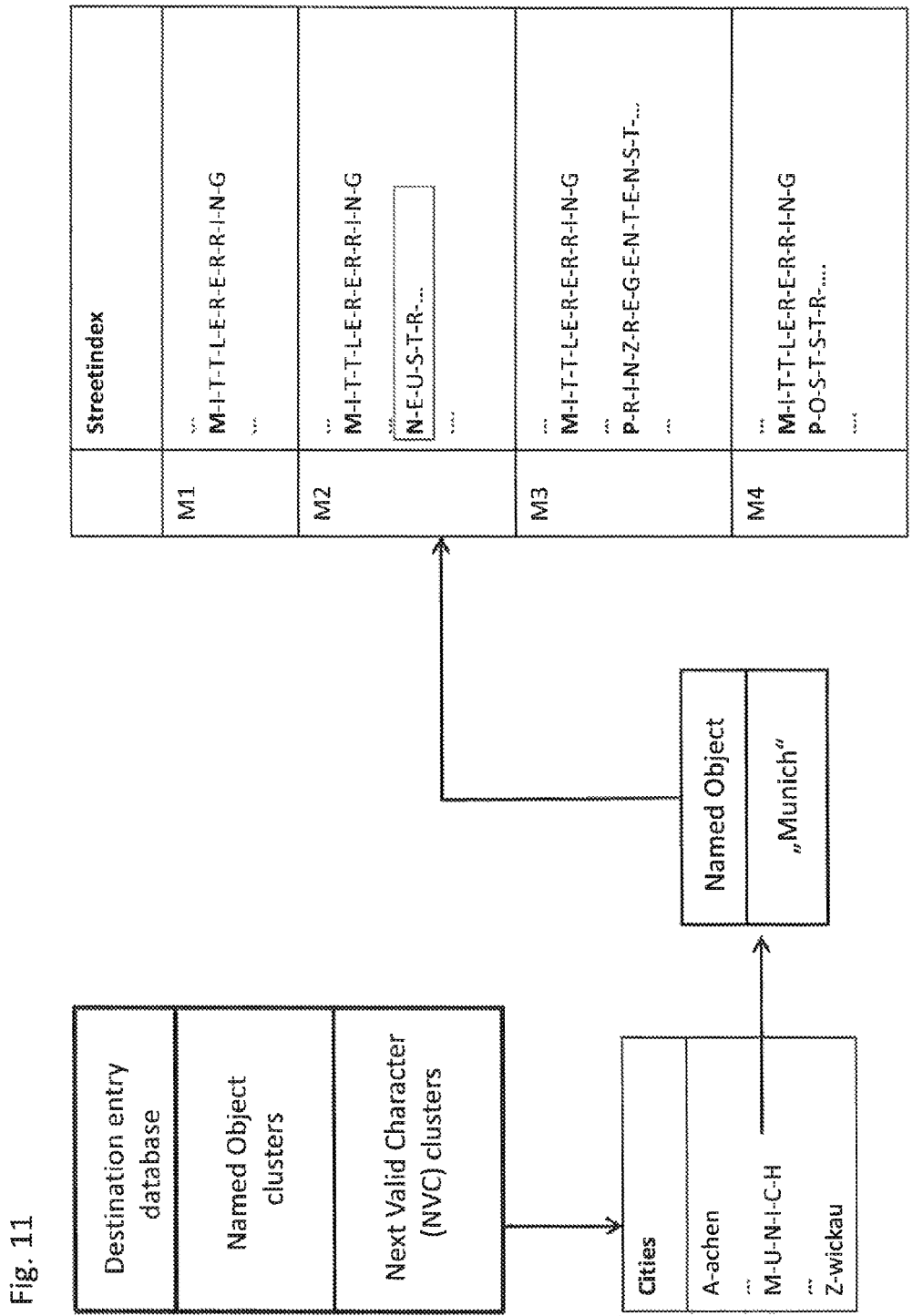
FIG. 11 schematically illustrates a navigation database structure for destination entry data according to one embodiment.

Further, in contrast to NDS database structuring the destination entry data are partitioned in accordance with the tile structure. That means that destination entry data (for instance street names) associated with the Named Object "Munich" are partitioned into parts M1, M2, M3, M4, each part comprising only street names to be associated with the route links of the corresponding tiles. With reference to FIG. 11, the partitioning concept for the destination entry data will be explained in more detail. As shown in FIG. 11, each part M1, M2, M3, M4 only comprises NVC indices for road names associated with the corresponding tiles 201, 203, 205, 207. For instance, M2 being associated with tile 201 comprises the NVC trees representing the road names "Neustrasse" and "Mittlerer Ring". The street name "Mittlerer Ring" is also represented by NVC trees of the parts M1, M2 and M4 since the corresponding tiles also comprise street segments thereof. Thus, the partitioning of the destination entry indices in accordance with the tiles ensures consistency between the roads contained in a local tile 201, 203, 205, 207 and roads that can be found by destination entry. Further, when an old/new street name have to be deleted/added (for instance "Neustrasse" in tile 201) only the corresponding destination entry part (in the present example M2) has to be updated. Thus, according to the present navigation database structuring scheme each tile represents all navigation data portions in a self-contained way, i.e., independent from navigation database portions of neighboring tiles (separated routing, map display and destination entry data).

However, in order to also provide a full NVC functionality in which all destination entry indices are loaded and displayed, the multiple NVC trees of the different parts M1, M2, M3, M4 are merged by a navigation application on the fly. Thus, although stored as separate parts, all streets of the object "Munich" are accessible by a user via the navigation NVC functionality.

With reference to FIGS. 12a/12b and 13 the incremental updating of the navigation database 20 being structured as explained above will be described in more detail.

FIG. 12a shows an embodiment of a navigation device 10 being in communication with a navigation data server 40. FIG. 12b schematically illustrates an update signal 32 provided by the server 40.

The navigation device 10 comprises the above described navigation database 20, a processing unit 12, a position sensor 14, an input/output (I/O-)module 16, a main memory 18, as well as a communication module 22. The position sensor 14 is configured to receive position coordinates from a positioning system, such as the Global Positioning System (GPS), Galileo or other systems. The I/O-module 16 represents an interface between navigation device 10 on the one hand and the user on the other hand. It may comprise optic and/or acoustic means for outputting calculated or searched navigation information. The main memory 18 is configured to buffer input data, data received over the communication module 22 and/or navigation data loaded from the database 20 for further processing by the processing unit 12. The processing unit 12 is configured to coordinate and process data received from the communication module (i.e., update data), data to be transmitted via the communication module (for instance, tile version data), data of the position sensor 14, of the I/O-module 16 and/or the navigation database 20 (indicated by the arrows in FIG. 11).

The communication module 22 is configured to support wireless and/or wired communication with external devices, such as the navigation server 40 and/or other navigation devices, user terminals (smart phones, PDA, etc.). The communication module may comprise at least one radio module (not shown in FIG. 12a) for supporting at least one of UMTS and GPRS communication.

The navigation server 40 comprises a data repository 42, a processing unit 44 as well as a communication module 46.

The processing unit 44 processes data received from or transmitted to the communication module 46 and/or the database repository 42. It also coordinates the data traffic in both directions.

The communication module 46 is configured to support wireless and wired communication with client (such as navigation device 10).

The database repository 42 is configured to store at least latest version navigation data related to individual countries, continents or other geographic regions. The data may be stored in a modular way. For instance, RDL routing data, destination entry data, map display data, POI data, TMC data, orthoimage data, 3D-data, etc. may be stored individually (as cluster units) and associated with appropriate tiles. In addition, the repository 42 comprises version data indicative of the navigation content versions of at least one of the RDL tiles and FDL level. Further, the navigation repository 42 comprises interlinking data 380 indicative of at least RDF-FDL interlinking and tile interlinking in the RDL.

With reference to FIGS. 12a/12b and 13 the incremental update for the above explained navigation database 20 will be described in detail.

In a first step (S10) the navigation device 10 transmits an update request 30 via the communication module 22. The update request 30 comprises information about current navigation data versions of the database 20. The information may be a simple information about the date of the last incremental or full update of the navigation database. Alternatively, the information may comprise in form of a version tree more detailed information about each individual RDL tile version.

In a second step (S20) the processing unit 44 of the navigation server 40 process and evaluates the update request 30 received via the communication module 46. In this context, the processing unit 44 compares the request signal 30 with the version data stored in the repository 42. In case, version differences between the received request signal 30 and the version data stored in the repository 42 are determined the processing unit further determines which RDL tiles have to be updated. The processing unit 44 then retrieves from the data repository 42 updated navigation content to be associated with the RDL tiles to be updated. In addition, the processing unit retrieves corresponding updated interlinking data 36 and RDL tile version data 38 and processes the retrieved data to data packets. The data packets are then transmitted as update signal 32 via the communication module 46 to the navigation device 10. The transmitted update signal 32 thus comprises updated navigation data 34 for at least one RDL tile, interlinking data 36 for the at least one RDL tile and, optionally, tile version data 38 (cf. FIG. 12b).

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the invention be limited only by the scope of the claims appended hereto.

What is claimed is:

1. A method of structuring navigation database content for supporting incremental data updates, comprising:
providing at least two data levels, wherein a first data level is associated with route links representing road segments of regional distance roads;
partitioning the first data level into local tiles, wherein each local tile is associated with route links representing road segments of regional distance roads associated with a specific local geographic area, wherein route links representing road segments extending over more than one local tile are split up into distinct route links representing road segment portions corresponding to the extending road segments within the corresponding local tiles; and establishing an interlinking between related split up route links of neighboring local tiles by organizing split up route links of each local tile in at least one special routing cluster, wherein the at least one special routing cluster comprises split up route links being organized in a route link table with fixed route link order and each being associated with a permanent identifier, and by referencing from a split up route link of a local tile to corresponding split up route links of neighboring local tiles using their permanent identifiers.

2. The method according to claim 1, wherein a second data level of the at least two data levels is associated with route links representing far distance road segments.

3. The method according to claim 2, wherein the route links within the second data level are organized independent of the local tile structure in the first data level.

4. The method according to claim 1, wherein the partitioning step further comprises:
providing the distinct route links with route link data for representing road segment portions of regional distance roads extending over neighboring tiles; and
assigning the distinct route links together with route link data to the corresponding local tiles.

5. The method according to claim 1, wherein providing an interlinking between route links of neighboring local tiles comprises:
providing each local tile with tile knots and tile knot identifiers;
assigning related split up route links of neighboring local tiles to be interlinked to tile knots of the neighboring tiles having the same identifier; and
providing each local tile with a tile knot identifier table representing an assignment between knots and split up links of the local tile.

6. The method according to claim 1, further comprising organizing route links representing road segments within each local tile into one or more routing clusters.

7. The method according to claim 1, further comprising providing an interlinking between route links associated with the at least two data levels by providing each data level with level knots and level knot identifiers.

8. The method according to claim 7, further comprising providing each local tile of the first data level with at least one first identifier table representing an assignment between route links of the local tiles to be interlinked with corresponding route links of the second data level and the corresponding level knots as well as providing the second data level with at least one second identifier table representing an assignment between the corresponding route links of the second data level to be interlinked with route links of the first data level and the corresponding level knots.

9. The method according to claim 1, wherein the database content further comprises at least one of basic map display data, destination entry data, Point Of Interest (POI) data, Traffic Message Channel (TMC) data and further enhanced navigation data.

10. The method according to claim 9, wherein the destination entry data of the navigation database are organized in accordance with the at least two data levels, wherein Local Destination Entry (LDE) data are associated with the first data level and Global Destination Entry (GDE) data are associated with the second data level.

11. The method according to claim 10, wherein GDE data comprise destination entry indices for far distance roads and cities or city parts and wherein LDE data comprise destination entry indices for regional distance roads.

12. The method according to claim 11, further comprising partitioning the destination entry indices associated with regional distance roads in accordance with the local tiles.

13. The method according to claim 1, wherein each local tile has a predefined size and wherein each local tile is further provided with a unique tile identifier.

14. The method according to claim 13, wherein routing clusters of a local tile are further assigned to the corresponding tile identifier.

15. The method according to claim 1, wherein each local tile is further provided with tile version data.

16. A method of incrementally updating a navigation database of a navigation device, the navigation database being structured in accordance with claim 1, and wherein the updating is performed by a navigation data server, comprising:
receiving an update request from the navigation device; and
providing the navigation device with updated navigation data on a local tile basis.

17. The method according to claim 16, wherein the update request comprises information about current navigation data version in the navigation database, and further comprising:
comparing the received information with navigation data versions available on the navigation data server; and
depending on a result of the comparison, providing the updated navigation data.

18. The method according to claim 16, wherein the updated navigation data may at least comprise one of updated routing data for at least one tile to be updated and updated interlinking data.

19. The method according to claim 16, wherein each local tile of the first data level is individually updatable by replacing at least one of navigation data, interlinking data and tile version data associated with the corresponding local tile during an incremental update procedure.

20. The method according to claim 16, wherein the first data level and second data level are independently updatable from each other or wherein the second data level is updatable together with the first data level by replacing the whole navigation data associated with the second data level.

21. A computer program product comprising a non-transitory computer-readable recording medium with program code for carrying out the method according to claim 1 when the computer program product is executed on a computer device.

22. A memory device including a navigation database structured in accordance with claim 1.

23. A navigation device comprising the memory device including the navigation database of claim 22.

24. A method for incrementally updating a navigation database of a navigation device, wherein the navigation database is structured in accordance with claim 1, the method comprising:
updating navigation data comprising at least updated routing data for at least one local tile of the first data level; and
updating interlinking data for the at least one local tile to be updated to ensure connectivity between the at least one updated local tile and the remaining unchanged navigation data of the navigation database.

25. The method according to claim 24, wherein the updated navigation data further comprises at least one of destination entry data, basic map display data, POI data and other enhanced navigation data for at least one local tile of the first data level.

26. The method according to claim 24, wherein the updated interlinking data comprise at least one permanent identifier table at least including an assignment between tile route links of the first data level to be interlinked with route links of the second data level and corresponding tile knots.

27. The method according to claim 24, further comprising updated tile version data.

28. The method according to claim 24, further comprising updated navigation data and interlinking data in form of a permanent identifier table for the second data level.

* * * * *